United States Patent
Ritter et al.

[15] 3,676,631
[45] July 11, 1972

[54] WELDING MACHINE AND METHOD

[72] Inventors: Josef Ritter; Hans Gott; Klaus Ritter; Gerhard Ritter, all of Styria, Austria

[73] Assignee: EVG Entwicklungs-und Verwertungsgesellschaft GmbH, Graz, Styria, Austria

[22] Filed: Oct. 2, 1970

[21] Appl. No.: 77,528

[30] Foreign Application Priority Data

Oct. 6, 1969 Austria .............................. A 9411/69

[52] U.S. Cl. ............................................... 219/56, 219/58,
[51] Int. Cl. ........................................................ B23k 11/00
[58] Field of Search .......................................... 219/56, 57, 58

[56] References Cited

UNITED STATES PATENTS 3,056,883  10/1962  Eisenberger et al. .................... 219/56
3,026,404  3/1962  Harris ...................................... 219/81

*Primary Examiner*—J. V. Truhe
*Assistant Examiner*—Hugh D. Jaeger
*Attorney*—Ernest F. Marmorek

[57] ABSTRACT

The invention relates to the welding of transverse rungs between longitudinal rods to form steel reinforcement, for concrete, known as "Bi-Steel." The rods are fed convergently and continuously through a resistance welding machine, the transverse rungs being successively positioned between the rods. A pair of welding electrodes are thrust from opposite sides against the rods to clamp each successive rung in position during welding by sequential spot welding. Each electrode travels around a closed path such that the electrode travels along with the rods when in contact therewith. The contact between the electrodes and the rods is preferably rolling contact so that any discrepancy between the speeds of the rods and of the electrodes causes rolling rather than sliding of the electrodes along the rods.

The electrodes may be rollers mounted on rotating carrier discs between which the rods pass. In one example each disc carries twelve roller electrodes each urged by a spring radially outwardly of the disc. In another example two electrodes are used each mounted on a beam extending between a crank and a rocking arm.

5 Claims, 4 Drawing Figures

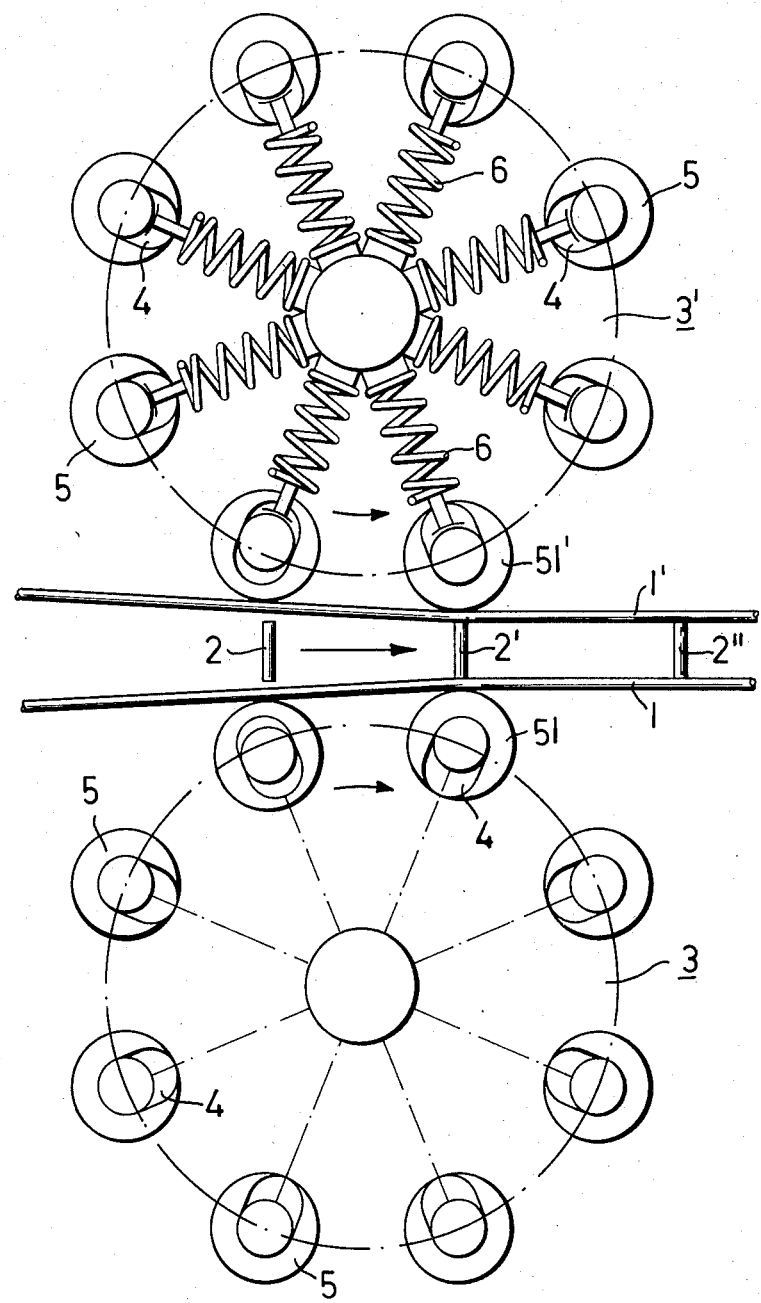

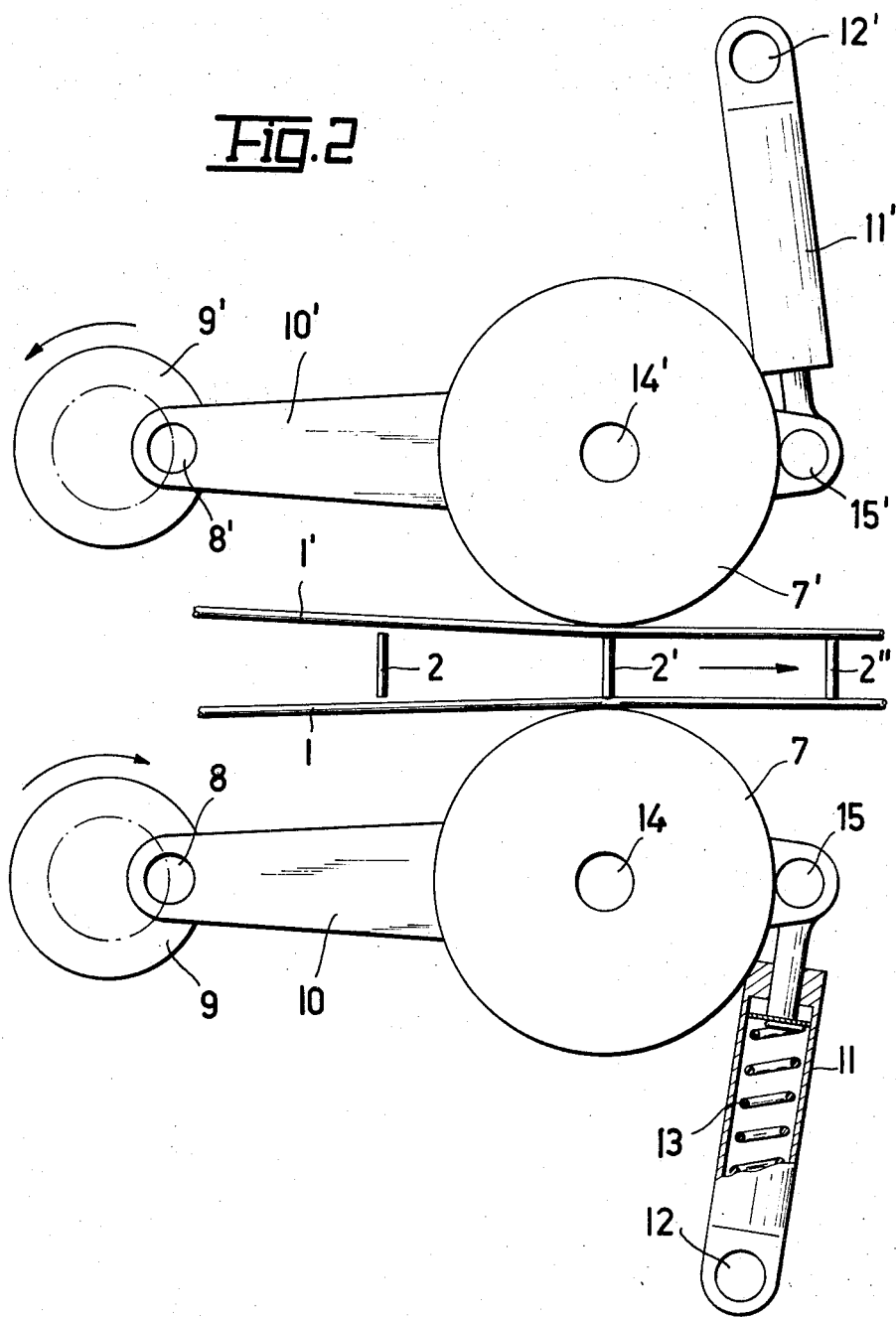

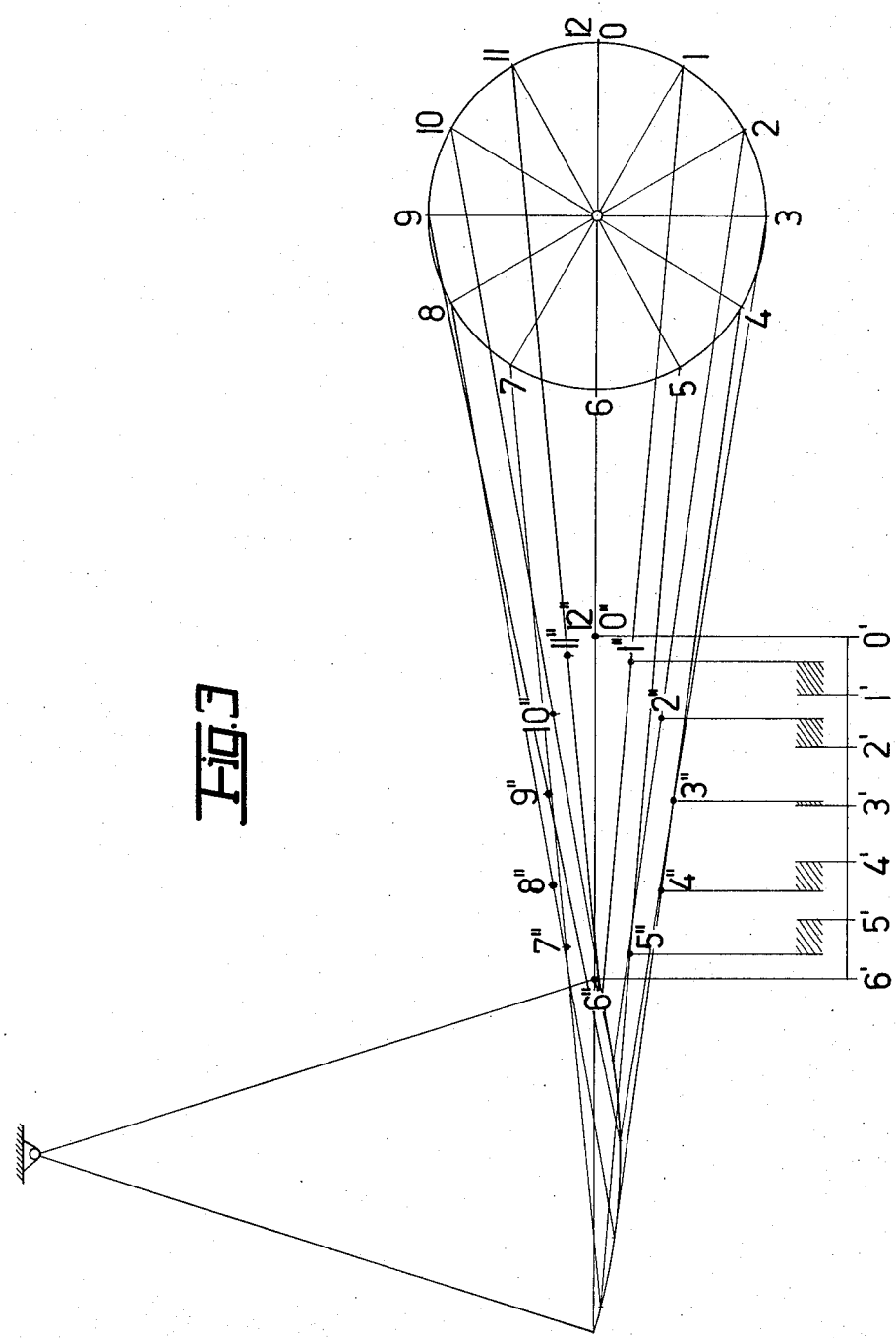

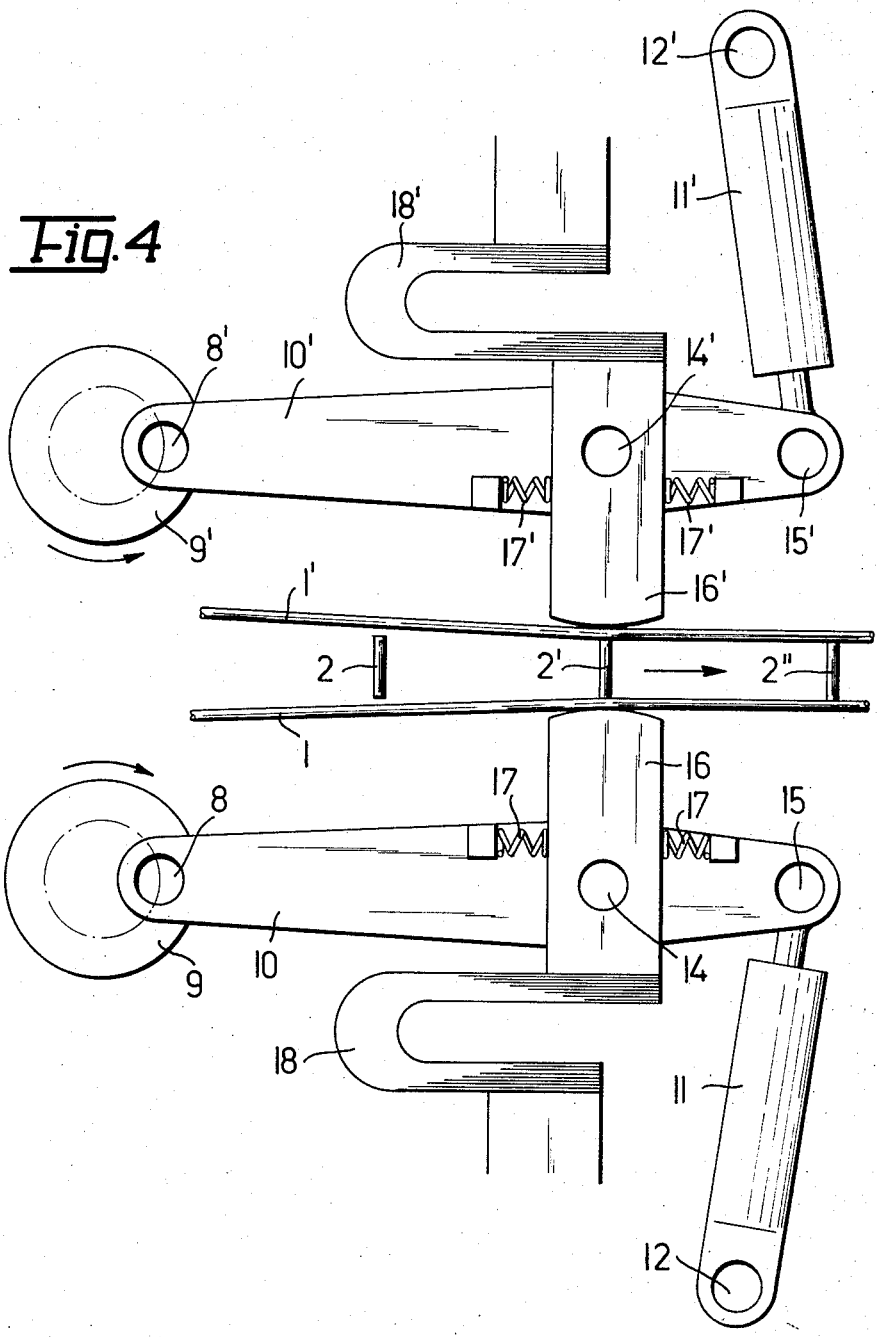

WELDING MACHINE AND METHOD

The invention relates to the manufacture of steel structures consisting of longitudinal steel rods joined together by welding transverse rungs between them. Steel structures of this kind are known in the trade as "bi-steel" structures, and they are used mainly as reinforcements for concrete.

These steel structures have hitherto usually been manufactured by feeding the longitudinal rods convergently into a welding machine, and inserting the transverse rungs between the longitudinal rods, before welding. Each transverse rung is clamped firmly in place between the two longitudinal rods by means of an externally applied pair of welding electrodes which are thrust inwards from either side into firm contact with the outer surfaces of the longitudinal rods. The welding is best done by the sequential-point method. When the welds have been completed the workpiece is advanced a step, ready for welding the next transverse rung. Thus the workpiece is fed through the welding machine intermittently, the welding being done during the intervals when he workpiece is stationary.

In the manufacture of wire mesh, that is to say structures made of steel wire, a material of smaller diameter than steel rod, longitudinal wires are conveyed continuously, together with the necessary transverse wires, between roller electrodes, which are thrust by springs or pneumatically against the wires, the thrust being applied perpendicularly with respect to the plane of the grating.

This method is however not suitable for welding steel structures made of rod, of the kind intended here, because with increasing rod diameter the period of time occupied in making each pair of welds soon becomes excessive. It would be necessary to advance the rod through the apparatus very slowly in order to obtain satisfactory welds without heating the rod on either side of the weld locations. The output would therefore be less than with hitherto used intermittent machines.

The steel rods used for these structures are preferably made of high strength cold worked steels. The surface of the rod can be smooth, or can if desired have ribs of the known kind, for example the rods can be of the kind known in the trade as "Queri-Stahl" or "Kari-stahl" rods. In manufacturing the welded structure it is necessary to ensure that the steel everywhere retains the desired mechanical properties, even where it has been subjected to the welding heat. For this purpose it is known to use steels for the longitudinal rods and for the transverse rungs which have compositions coordinated with each other in such a way that the welding heat produces a hot tempering of the steel in the region of the weld.

As long as the region heated by the welding is limited to the immediate neighborhood of the joint between the longitudinal wire and the transverse rung, the impairment of the steel properties produced in cold worked steels by the welding heat can always be compensated by suitably choosing the steel analysis, for example by promoting a carbon exchange between a low carbon and a high carbon steel. But in the case where the steel rods are heated further away from the weld locations it is not possible to obtain reliably, by hot tempering, the entirely even properties which are necessary in view of the subsequent application of these structural parts.

In accordance with the present invention, transverse rungs are welded between longitudinal rods by a method in which the longitudinal rods are fed convergently into a welding machine, which feeds the transverse rungs into position between the rods, and the longitudinal rods and the transverse rungs are advanced at a constant linear speed through the machine, and at least one pair of welding electrodes being thrust from opposite sides against the longitudinal rods so as to clamp each successive transverse rung firmly in position between the rods, each welding electrode being moved around a closed path such that the electrode, during the periods when it is in contact with the rods, moves along with the rods, the welding being effected during this movement by sequential-spot welding.

The longitudinal rods and transverse rungs are preferably advanced continuously at constant linear speed by a drive mechanism which functions independently of the conveying mechanism which conveys the electrodes. This is necessary in cases where there are periods between welding operations when no electrodes are in contact with the rods and is desirable in other cases.

When the electrodes are in contact with the workpiece they are thrust firmly from either side against the surfaces of the longitudinal rods. The applied thrust is fairly high, too high to allow the contiguous surfaces to slide over each other without damage, particularly to the electrodes. After a period during which the electrodes remain in contact with the workpiece, they leave the workpiece and travel around independently, to make contact with the workpiece once more at a succeeding welding location.

To avoid the possibility of sliding of the electrode over the rod during welding the electrode is preferably in rolling contact with the rod at this time.

Apparatus for carrying out the method according to the invention includes means for feeding a pair of longitudinal rods convergently and at a constant linear speed between at least one pair of electrodes and means for feeding transverse rungs between the two rods, each electrode being carried by a mechanism which conveys the electrode so that it moves around a closed path and so that, during this movement, the electrode is thrust against the surface of the workpiece and follows the linear advance of the workpiece, whereby each successive transverse rung is firmly clamped in its correct position between the two longitudinal rods.

Three examples of machines according to the invention, and their methods of operation, are illustrated in the accompanying drawings, in which:

FIG. 1 is a plan view of the first machine;

FIG. 2 is a plan view of the second machine;

FIG. 3 illustrates movements of electrode rollers used in the machines of FIGS. 2 and 4; and, FIG. 4 is a plan view of the third machine.

With reference to FIG. 1, a pair of longitudinal rods 1 and 1' and a supply of transverse rungs 2, 2', 2'' are fed continuously through the welding machine in the direction of the arrow by a feeding mechanism which is not shown in the drawing and which may be of any convenient kind. The longitudinal rods 1, 1' are fed into the machine convergently, the transverse rungs being introduced correctly positioned between the longitudinal rods, ready for welding. On either side of the longitudinal rods there are disc shaped rotary electrode supports 3, 3', which rotate continuously as indicated by the arrow in FIG. 1, the rims of the support discs following the movement of the rods 1 and 1'. The speeds of rotation of the support disc 3, 3' are synchronized with the movement of the rods so that the tangential velocity matches the linear velocity of advance of the rods.

Each electrode support disc 3, 3' has around its rim a number of radial slots 4 in which electrode rollers 5 are guided and are thrust outwards by springs 6, which are shown for greater clarity only in the upper part of FIG. 1.

In each support disc, each roller electrode is connected electrically over a slipring contact with the secondary winding of a welding transformer. For each welding operation the two roller electrodes on opposite sides of the workpiece are charged at opposite polarities, so that at a given instant the roller electrode 51, for example, of the electrode support 3 delivers current through the longitudinal rod 1, through the transverse rung 2', the longitudinal rod 1' and the roller electrode 51' to the second electrode support 3', welding the rung to the two longitudinal rods by means of a sequence of spot welds (sequential-spot welding).

The slipring contact can if desired be arranged in a plane parallel to the plane of the electrode support, the contact being thrust by a spring against the stubaxle of the roller electrode working in the slot 4.

In FIG. 2 there are only two roller electrodes 7, 7', each of which rotates on a bearing pin 14, 14' projecting from a beam 10, 10'. One end of each beam is pivoted on a crank pin 8, 8' projecting from a crank disc 9, 9'. The other end of the beam is pivoted on a pin 15, 15' mounted on the end of a spring loaded rocking arm 11, 11', which rocks about a pivot pin 12, 12'. Each rocking arm 11, 11' consists of two parts and a spring arranged so that the pivot pin 15, 15' is thrust towards the workpiece by the corresponding spring 13, the movement being limited by a stop. Electric power is supplied to each roller electrode over a slipring contact.

FIG. 4 shows a somewhat similar arrangement, but in this case instead of the roller electrodes of FIG. 2 there are two rocking electrodes 16 and 16', which have curved thrust surfaces, for engaging the workpiece, the curvature being an arc of a circle. Each rocking electrode 16, 16' rocks on a pivot pin 14, 14' of a beam 10, 10', the rocking electrode being retained in its normal position, when its thrust face is not in contact with the workpiece, by pairs of centralizing springs 17 and 17'. In this example, the electric current is supplied to the electrodes over flexible ribbon leads 18 and 18'.

FIG. 3 illustrates the geometry of the movements of the parts of the examples represented in FIGS. 2 and 4. At the top in FIG. 3 the positions of the crank pin 8 are represented on a circle during a complete rotation of the crank disc 9. The crank pin 8 moves from an initial position 0 around the circle to the final position 12, which coincides with the initial position 0. During this movement the bearing pin 14 follows an approximately ellipsoidal path, from the initial position 0" around to the final position 12". Let it be assumed that the movement starts at an initial instant 0. At this instant the electrode bearing 14 is at the position 0" in FIG. 3. Opposite this position 0" a point on the workpiece rod is at the position 0'. Subsequently at the instant 1 the bearing 14 has reached the position 1", whereas the point on the workpiece rod has reached the position 1', the bearing 14 lagging behind the workpiece by the amount represented by the hatched rectangle in FIG. 3. It will be observed that whereas the workpiece advances at a constant linear speed, the bearing 14 at first lags behind, and then catches up and hurries ahead, until finally the bearing 14 is again level at 6" with the same point on the workpiece, which has now reached the position 6'.

This lagging behind and hurrying ahead effect is accommodated by rotation of the electrodes 7 and 7' in FIG. 2 and by the rocking movement of the electrodes 16 and 16' in FIG. 4, so that there is obtained a rolling thrust applied to the workpiece rod. In regard to the version represented in FIG. 1, the relative movements are essentially similar, and a similar rolling thrust is applied to the workpiece rod.

For the sake of completeness it should be mentioned that instead of the rocking arm 11 there can if desired be used any one of several alternative methods for guiding the pivot pin 15, for example a slot to give a straight line movement, or two links of equal length, giving a parallel movement.

We claim:

1. A method of manufacturing steel structures which comprise a pair of longitudinal rods and a plurality of transverse rungs welded therebetween, said method comprising the steps of advancing said rods continuously and convergently into a resistance welder at constant linear speed, feeding said transverse rungs successively into position between said longitudinal rods, and moving each of a pair of electrodes in a generally ellipsoidal closed path, said rods being advanced between said electrodes, and said closed path having a first portion during which said electrode moves into engagement with a corresponding one of said rods to clamp successive transverse rungs in position, a second portion during which said electrode advances with said rod while said transverse rung is welded to said rod by sequential-spot welding, and a third, return portion during which said electrode is clear of said rod.

2. A method according to claim 1, wherein each of said electrodes is in rolling contact with said corresponding rod during said second portion of said closed path.

3. Welding apparatus for manufacturing steel structures comprising a pair of longitudinal rods and a plurality of transverse rungs welded therebetween, said apparatus comprising means for feeding said pair of longitudinal rods convergently into said apparatus at constant linear speed, means for feeding transverse rungs successively into position between said longitudinal rods, two electrodes positioned on either side of said rods, conveying means mounting said electrodes and being adapted to convey each said electrode around a generally ellipsoidal closed path having a first portion during which said electrode moves into engagement with a corresponding one of said rods, a second portion during which said electrode advances with said rod and a third, return portion during which said electrode is clear of said rod, said conveying means comprising for each said electrode bearing means, a crank, a beam pivotally connected at one end thereof to said crank and a rocking arm pivotally connected to the other end of said beam.

4. Apparatus according to claim 3, wherein each electrode is a roller.

5. Apparatus according to claim 3, wherein each electrode is adapted to rock about its bearing means and has a thrust surface in the form of a circular arc for engaging said corresponding rod.

* * * * *